(12) United States Patent
Beenau et al.

(10) Patent No.: US 9,373,122 B2
(45) Date of Patent: Jun. 21, 2016

(54) METHODS, APPARATUS AND COMPUTER PROGRAM PRODUCTS FOR SECURELY ACCESSING ACCOUNT DATA

(75) Inventors: Blayn W. Beenau, Peoria, AZ (US); Amy A. Glavasich, Kingston, NY (US); William J. Gray, Peoria, AZ (US); Leigh R. Malnati, Mountain Lakes, NJ (US); Cathy A. McGarity, Scottsdale, AZ (US); Danielle R. Nulle, Atlantic Highlands, NJ (US); Sevia N. Phillips, Norwalk, CT (US)

(73) Assignee: III Holdings 1, LLC, Wilmington, DE (US)

( * ) Notice: Subject to any disclaimer, the term of this patent is extended or adjusted under 35 U.S.C. 154(b) by 215 days.

(21) Appl. No.: 12/512,873

(22) Filed: Jul. 30, 2009

(65) Prior Publication Data

US 2010/0161493 A1  Jun. 24, 2010

Related U.S. Application Data

(60) Provisional application No. 61/138,711, filed on Dec. 18, 2008.

(51) Int. Cl.
*G06Q 20/00* (2012.01)
*G06Q 30/02* (2012.01)
*G06Q 20/38* (2012.01)
*H04L 9/32* (2006.01)

(52) U.S. Cl.
CPC ........ *G06Q 30/0225* (2013.01); *G06Q 20/3829* (2013.01); *G06Q 30/0222* (2013.01); *G06Q 30/0226* (2013.01); *H04L 9/3271* (2013.01); *H04L 2209/56* (2013.01); *H04L 2209/60* (2013.01)

(58) Field of Classification Search
CPC ..................................................... G06Q 20/00
USPC .......................................................... 705/71
See application file for complete search history.

(56) References Cited

U.S. PATENT DOCUMENTS

| 8,515,937 B1 | 8/2013 | Sun et al. |
| 2001/0054003 A1 | 12/2001 | Chien et al. |
| 2003/0126015 A1 | 7/2003 | Chan et al. |

(Continued)

FOREIGN PATENT DOCUMENTS

JP  2007156806 A  *  6/2007

OTHER PUBLICATIONS

Office Action dated Dec. 27, 2011 in U.S. Appl. No. 12/639,731.

(Continued)

*Primary Examiner* — James A Reagan
(74) *Attorney, Agent, or Firm* — Meyertons, Hood, Kivlin, Kowert & Goetzel, P.C.

(57) ABSTRACT

Customer data is securely downloaded to a browser toolbar by performing a check to determine whether a request for customer data includes a request for personal identifiable information requiring encryption by a public encryption key generated by the browser toolbar. The customer is authenticated based on a set of a user credential and an account specific access credential. The account specific access credential is associated with the account of the customer. Requested personal identifiable information is encrypted using the public encryption key generated by the browser toolbar. Encrypted personal identifiable information is transmitted to the browser toolbar.

20 Claims, 5 Drawing Sheets

(56) References Cited

U.S. PATENT DOCUMENTS

| | | | |
|---|---|---|---|
| 2004/0061720 A1* | 4/2004 | Weber | 345/760 |
| 2005/0119937 A1 | 6/2005 | Estes | |
| 2005/0120121 A1 | 6/2005 | Guo et al. | |
| 2005/0172229 A1* | 8/2005 | Reno et al. | 715/700 |
| 2006/0010484 A1 | 1/2006 | Fujino | |
| 2007/0022007 A1 | 1/2007 | Lawe | |
| 2008/0097857 A1 | 4/2008 | Walker et al. | |
| 2008/0262920 A1 | 10/2008 | O'Neill et al. | |
| 2009/0271259 A1 | 10/2009 | Fish | |

OTHER PUBLICATIONS

Final Office Action dated Apr. 27, 2012 in U.S. Appl. No. 12/639,731.
Advisory Action dated Jul. 18, 2012 in U.S. Appl. No. 12/639,731.
Office Action in U.S. Appl. No. 12/639,731 mailed Jul. 15, 2015, 21 pages.

* cited by examiner

Create Browser Toolbar Key Pair

FIG. 5

METHODS, APPARATUS AND COMPUTER PROGRAM PRODUCTS FOR SECURELY ACCESSING ACCOUNT DATA

CROSS REFERENCE TO RELATED APPLICATIONS

This application claims priority to, and the benefit of, U.S. Provisional Patent Application Ser. No. 61/138,711, filed Dec. 18, 2008, which is hereby incorporated by reference in its entirety.

BACKGROUND OF THE INVENTION

1. Field of the Invention

The present invention generally relates to securely processing customer account data, and more particularly to a system, computer program product, and method for securely interfacing card issuer databases with a client system tool.

2. Related Art

The proliferation of rogue programs such as viruses, trojan horses, and computer hackers, etc., places computing devices at risk. Customer account data which is stored, even temporarily, on a customer's computing device is potentially at risk due to these malicious entities. As a result, customers, merchants, and card issuers are reluctant to utilize tools which reside on a customer computing device and interface with sensitive customer account data.

Notwithstanding such environments, online shopping through customer computing devices is now just as common as in-store shopping. A payment transaction is typically performed by a customer through a personal computer connected to a public network such as the Internet. Typically, a customer, whether through the merchant's web site or a third party payment processing web site, manually enters his or her account information into fields on a web page to process the transaction. To avoid memorizing information, such as account numbers, and to avoid typing additional information used to make a purchase, some customers use customer account data storage programs. This permits the customer to avoid the tedious task of manually entering this information during each transaction. Such a program (or devices) is often referred to as a digital wallet or an e-wallet program.

A digital wallet program allows a customer to store information which can be automatically loaded into a merchant website form which is used to complete a transaction. While digital wallet programs remove the hassle associated with manually entering account information for each transaction, a user still is required to enter some information prior to their initial use.

One legitimate concern is that the information that is manually or automatically loaded at the customer's device can be exposed to rogue programs running on the customer's computing device. Even if the account data is ultimately stored in an encrypted form, the account data may also be exposed during data entry and prior to encryption by the digital wallet software. Accordingly, card issuers are reluctant to provide customer computing devices access to customer account data.

Communications between the customer's computing device and card issuer databases are typically encrypted. Once the customer account data is received by the customer computing device, however, the data is decrypted for use by the customer (e.g., viewing or storage) and may then be intercepted, snooped, or otherwise accessed by rogue programs running on the customer's device.

While customers are able to access recent transactions, payments, and statements through card issuer websites, these interfaces do not provide access to the customer account data required for transaction processing. For instance, typically only the last four digits of a credit card number will be displayed.

Given the foregoing, one technical challenge is to allow data, such as sensitive customer account data, to be transmitted to a computing device and decrypted within the receiving computing device such that the data is not exposed to malicious entities external or internal to the computing device.

BRIEF DESCRIPTION OF THE INVENTION

The present invention meets the above-identified needs by providing a system, method and computer program product for securely interfacing card issuer databases with a client system tool.

In one embodiment a method and computer readable medium are provided for securely downloading customer data to a browser toolbar. Via the browser toolbar, a request for customer data from a customer is received. A check is performed to determine whether the request for customer data includes a request for personal identifiable information requiring encryption by a public encryption key generated by the browser toolbar. The customer is authenticated based on a set of a user credential and an account specific access credential. The user credential and the account specific access credential are distinct, and the account specific access credential is associated with an account of the customer. The requested personal identifiable information is encrypted using the public encryption key generated by the browser toolbar. The encrypted personal identifiable information is transmitted to the browser toolbar.

In another embodiment, a system for securely integrating personal identifiable information with a browser toolbar unit is provided. The system includes a web interface unit, a toolbar server application, and a transmission unit. The web interface unit is configured to receive, via the browser toolbar, a request for customer data from a customer. The toolbar server application is configured to determine that the request for customer data includes a request for personal identifiable information requiring encryption by a public encryption key generated by the browser toolbar; to authenticate the customer based on a set of a user credential and an account specific access credential; and to encrypt the requested personal identifiable information using the public encryption key generated by the browser toolbar. The user credential and the account specific access credential are distinct, and the account specific access credential is associated with an account of the customer. The transmission unit is configured to transmit the encrypted personal identifiable information to the browser toolbar.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION

The present invention is directed to a system, method and computer program product for securely interfacing card issuer databases with a client system tool. In an exemplary embodiment the client system tool is a web browser toolbar. The toolbar of the present invention allows customers of card issuers to securely manage their account data in environments, such as a customer's computer, which may otherwise be insecure.

The terms "user," "customer," "cardmember," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant may be a grocery store, a retail store, a travel agency, a service provider, an on-line merchant or the like. The term "vendor" is sometimes used interchangeably with the term "merchant".

A "card" as used herein refers to both "open cards" and "closed cards." "Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

An "account" as used herein refers to an account associated with an open account or a closed account system. The account may exist in a physical or non-physical embodiment. For example, an account may be distributed in non-physical embodiments such as an account number, frequent-flyer account, telephone calling account or the like. Furthermore, a physical embodiment of a transaction account may be distributed as a financial instrument.

A "card issuer" and "issuer" as used herein refer to an organization that issues a transaction account and associated financial instrument (e.g., payment device, transaction card, and the like) to a cardmember. They also are responsible for maintaining details of the cardmember's account including eligibility for services, payments made, charges incurred, and the like.

An "e-wallet" as used herein refers to any data storage implementation which allows data associated with a customer to be stored and used to make electronic commerce transactions. The term "digital wallet" is also used interchangeably with the term "e-wallet."

"Personal identifiable information" (PII) as used herein refers to any data that a customer, merchant, card issuer or the like wishes to keep confidential. For example, PII data may include a social security number (SSN), outstanding loan information, credit report information, a card account number, and the like.

A "web service" as used herein refers to one or more software components, hardware components, or any combination thereof, associated with providing, receiving, and/or interfacing with data over a network.

Figure 1:
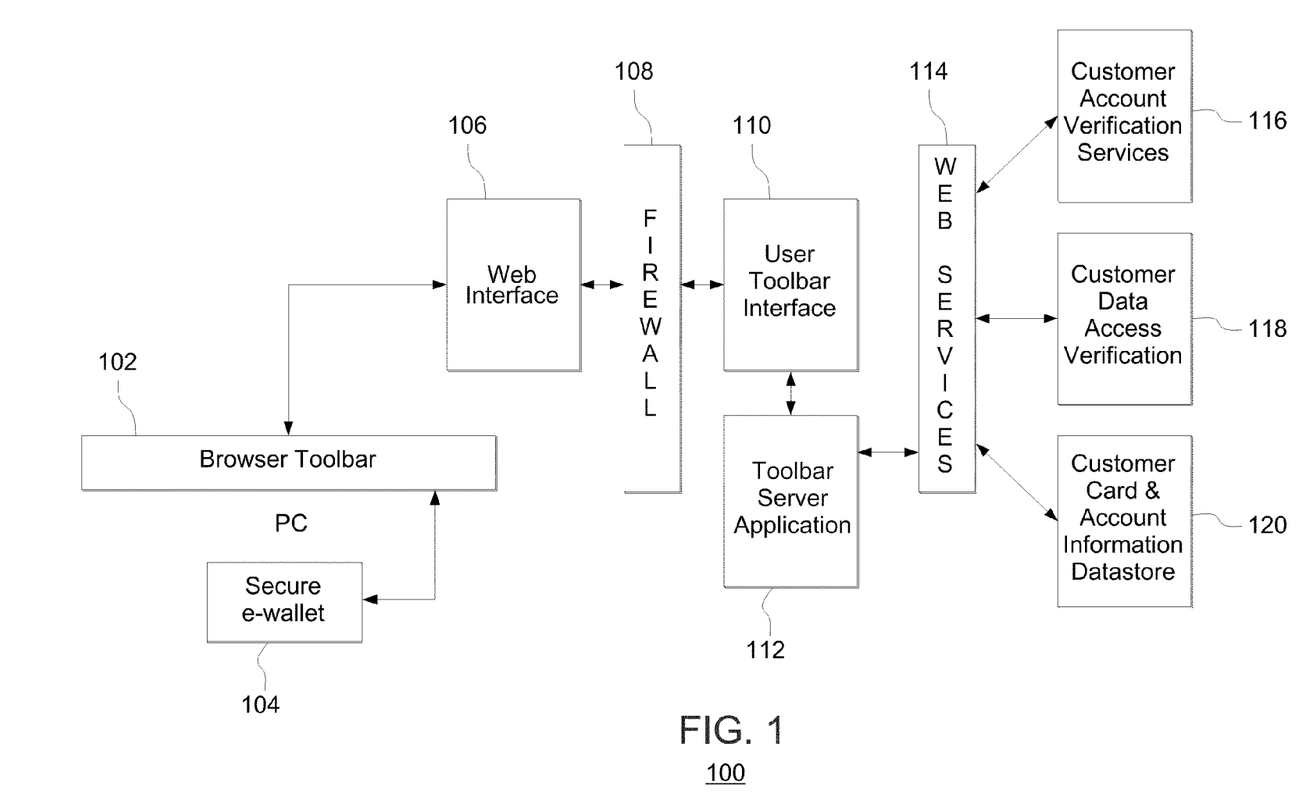
FIG. 1 is a collaboration diagram of functional modules deployed on one or more computer systems for implementing secure access to personal identifiable information in one embodiment of the present invention.

FIG. 1 is a collaboration diagram of functional modules deployed on one or more computer systems for implementing secure access to PII data in accordance with an embodiment of the present invention. In one embodiment, a browser toolbar 102 includes a secure e-wallet 104 to securely access and store PII data. Browser toolbar 102 is in communication with a user toolbar interface 110 and a toolbar server application 112. Toolbar interface 110 translates the protocol used to communicate with browser toolbar 102. Particularly, user toolbar interface 110 interprets data requests received from browser toolbar 102 and passes each request to toolbar server application 112. Similarly, user toolbar interface 110 interprets responses from toolbar server application 112 and passes the interpreted response to browser toolbar 102.

Web services 114 is an interface between toolbar server application 112 and services such as customer account verification services 116, customer data access verification 118 and customer card and account information datastore 120. These services and interfaces can be associated with one or more card issuers, via web interface unit 106 and firewall unit 108.

Web services 114 controls operations between toolbar server application 112, customer account verification services 116, customer data access verification 118, and customer card and account information datastores 120.

The individual logic units of decisioning/orchestration units described above (i.e., blocks 110-120) may be implemented in one or more computer systems or other processing systems, such as the secure information access system described below with respect to FIG. 2, for instance. In addition, units 110-120 can be operated and controlled by one or more card issuer systems, a third party system, or a combination of each.

Browser toolbar 102 is integrated within the user interface of a web browser residing on a customer's computer system. Web services initiated on the customer's system are analyzed by the browser tool bar unit 102 to detect a request for PII data. The browser tool bar unit 102 detects a PII data request based on the type of web service initiating the request or by analyzing the content within the request (e.g., detecting an account number field).

As discussed above, transferring and managing PII data requires a higher level of security due to its confidential nature. Accordingly, after detecting a PII data request, browser toolbar 102 creates a public/private key pair which will be used to encrypt and transmit the requested PII data from web interface 106 to browser toolbar 102. Because the browser toolbar 102 resides on the customer's computer system, the public key is transmitted to toolbar server application 112 after creation. Preferably, the private key is not shared outside the browser toolbar unit 102. In this case, browser toolbar unit 102 is the sole unit which can decrypt the PII data received from web interface 106.

Creation of the public/private key pair is discussed further below with respect to FIG. 4. Preferably a distinct public/private key pair is generated to encrypt and transmit each respective PII data request.

Toolbar server application 112 inspects requests received from browser toolbar 102 to also determine when PII data is requested. PII data requests are detected by analyzing the type of web service making the request or the content of the request itself.

Upon detecting a PII data request from browser toolbar unit 102, toolbar server application 112 requests user credentials, e.g., a username and password, from the customer. The customer is authenticated by verifying that the customer's user credentials correspond to a valid customer account record maintained by account verification services unit 116.

An authenticated customer is provided access to generic account data. Particularly, toolbar server application 112 will query customer card and account information datastore unit 120 for generic account data associated with the customer. More than one card may be associated with the customer. Upon a search of the records stored in customer card and account information datastore unit 120, toolbar server application 112 determines all the cards associated with the customer that are eligible for use with the web service that initiated the PII data request at the customer's system.

Generic card data associated with each eligible card is sent to the customer's computer for presentation to the user. This data includes enough information for the customer to decipher one card from another upon presentation. Preferably, for each eligible card, the customer is presented generic card data that includes, for example, a picture associated with the card and the last 5 digits of the card. The customer may then select one or more cards presented for PII data download.

Before PII data can be downloaded, the toolbar application processing unit 114 verifies whether the customer has a high enough level of access privileges to access the PII data requested. Particularly, PII data access is granted after verifying card specific access credentials for each card the customer selected for PII data download. Accordingly, the customer is asked to enter card specific access credentials for each card selected.

Card specific access credentials include, for example, a security code unique to a particular card. The security code may be a 3 or 4 digit code printed on the card. Each security code number is verified by toolbar server application 112 with the records stored in a database of customer data access verification 118.

Once card specific access credentials are verified, PII data for each selected card can be downloaded to the browser toolbar 102. Toolbar application processing unit 114 retrieves the requested PII data from customer card and account information datastore 120. The retrieved PII data is encrypted using the public key previously received from the browser toolbar 102 and then transmitted to browser toolbar 102 via user toolbar interface 110 and web interface 106.

Because browser toolbar 102 maintains the private key required for decrypting the PII data, the customer's PII data is protected if it is intercepted by another unit external or internal to the customer's computer system during transmission to browser toolbar 102. After receipt of the encrypted PII data, browser toolbar 102 decrypts the PII data and stores it in secure e-wallet 104. The customer can retrieve the stored PII data from secure e-wallet 104 to complete a transaction requiring entry of PII data.

In another embodiment, the public/private key pair created by browser toolbar 102 is used to encrypt/decrypt multiple PII data requests as opposed to distinct PII data requests as discussed above. Additionally, the public/private key pair created by browser toolbar 102 may be created prior to, during, or after detecting a PII data request.

In another embodiment, the PII data stored in secure e-wallet 104 is deleted upon the customer closing the current web browser session upon which the PII data was downloaded. Alternatively, the PII data may be deleted during or after the customer initiates a merchant based transaction that requires entry of the PII data.

In yet another embodiment, stored PII data may be updated as changes to customer card and account information datastore 120 occur via browser toolbar 102. These updates may occur at the request of the customer or at regularly scheduled intervals and times. Further, prior to a customer attempting to execute a transaction with a merchant using PII data stored in secure e-wallet 104, browser toolbar 102 can check to see if the PII data currently stored in the secure e-wallet 102 needs to be updated.

For instance, a customer's credit card may have expired since the PII data for the credit card was loaded into secure e-wallet 102 or a customer may have received a new credit card. In such cases, the PII data stored in the secure e-wallet 102 is updated to reflect the credit card's new expiration date or the existence of the new credit card. Access to updated PII data may require a similar authentication procedure discussed above to access the originally downloaded PII data. Particularly, the customer will again have to enter user access credentials and card specific access credentials for the particular card's PII data being updated. Similarly, the updated data will then be securely transmitted to the browser toolbar 102.

Figure 2:
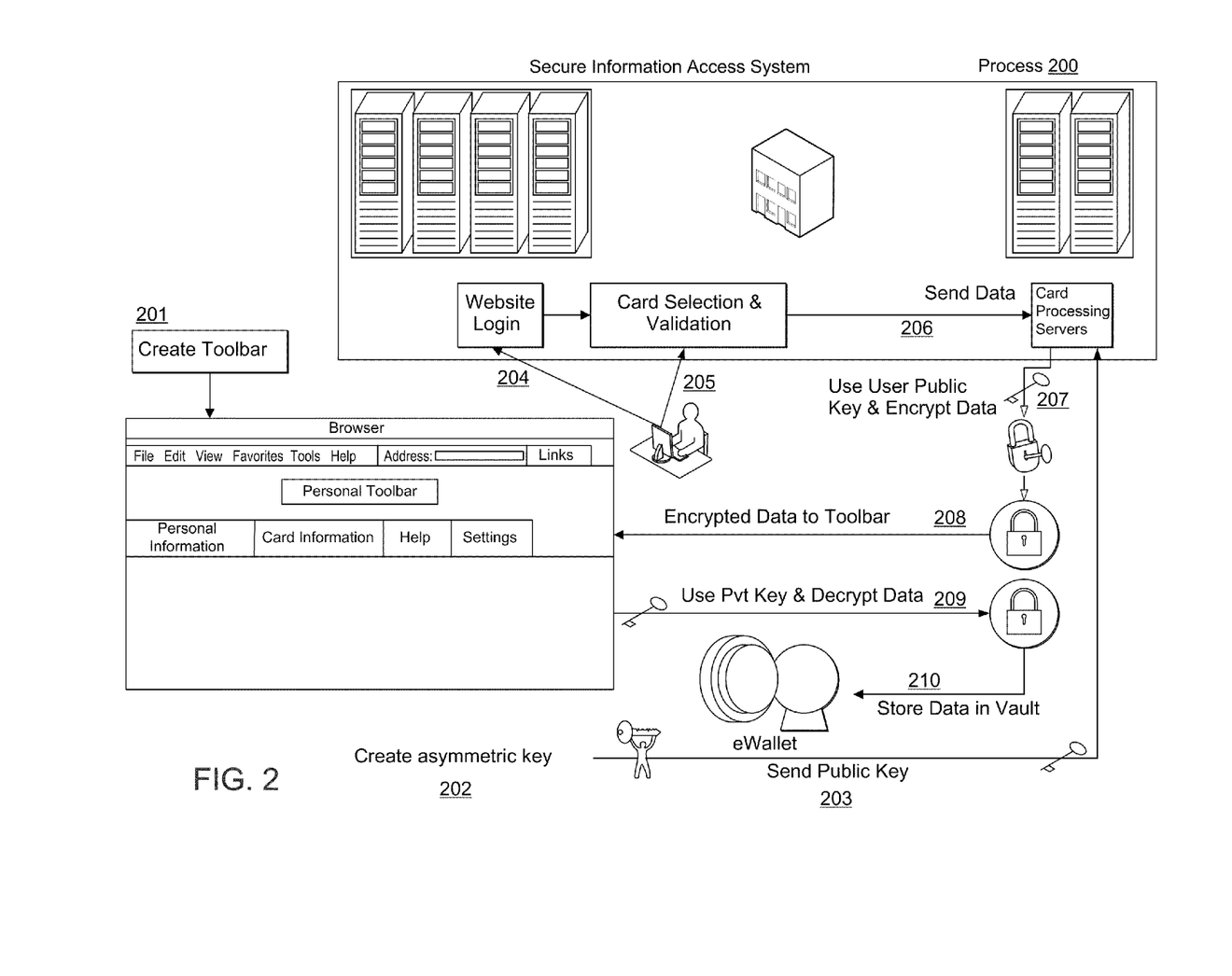
FIG. 2 is a flowchart illustrating a secure personal identifiable information access process in one embodiment of the present invention.

FIG. 2 illustrates a secure PII data access process 200, in accordance with an embodiment of the present invention. Generally, process 200 securely downloads PII card data from a secure information access system to a customer's computer system. The secure information access system is preferably associated with one or more card issuers.

In block 201, a browser toolbar, such as browser toolbar 102, is created on the customer's computer system. Particularly, browser toolbar 102 is provided by one or more card issuers or another entity to the customer's computer system. Web services running on the customer's computer system are monitored by the browser toolbar to detect when PII data is requested. Upon detecting a PII data request, in block 202, browser toolbar 102 creates a public/private key pair to service the PII data request.

At block 203, the public key created by the browser toolbar is transmitted from the customer's computer system to one or more card processing servers at the secure information access system.

In addition to the public/private key creation in response to a PII data request, the customer is requested to provide user credentials to access a card issuer's web interface, as shown in block 204. For each card eligible for use with the web service that initiated the PII data request and which the customer wishes to access PII data for, in block 205 the customer is requested to provide card specific access credentials. After verifying the customer's user credentials and the card specific access credentials required to access the requested PII data, in block 206 the card processing servers will retrieve the requested PII data.

At block 207, the card processing servers encrypt the retrieved PII data using the public key previously sent in block 203. Encrypted PII data is then transmitted to the browser toolbar at the customer's computer system, block 208, for decryption, block 209, by the browser toolbar. The decrypted PII data is stored in an e-wallet, block 210, for use by the customer.

Figure 3:
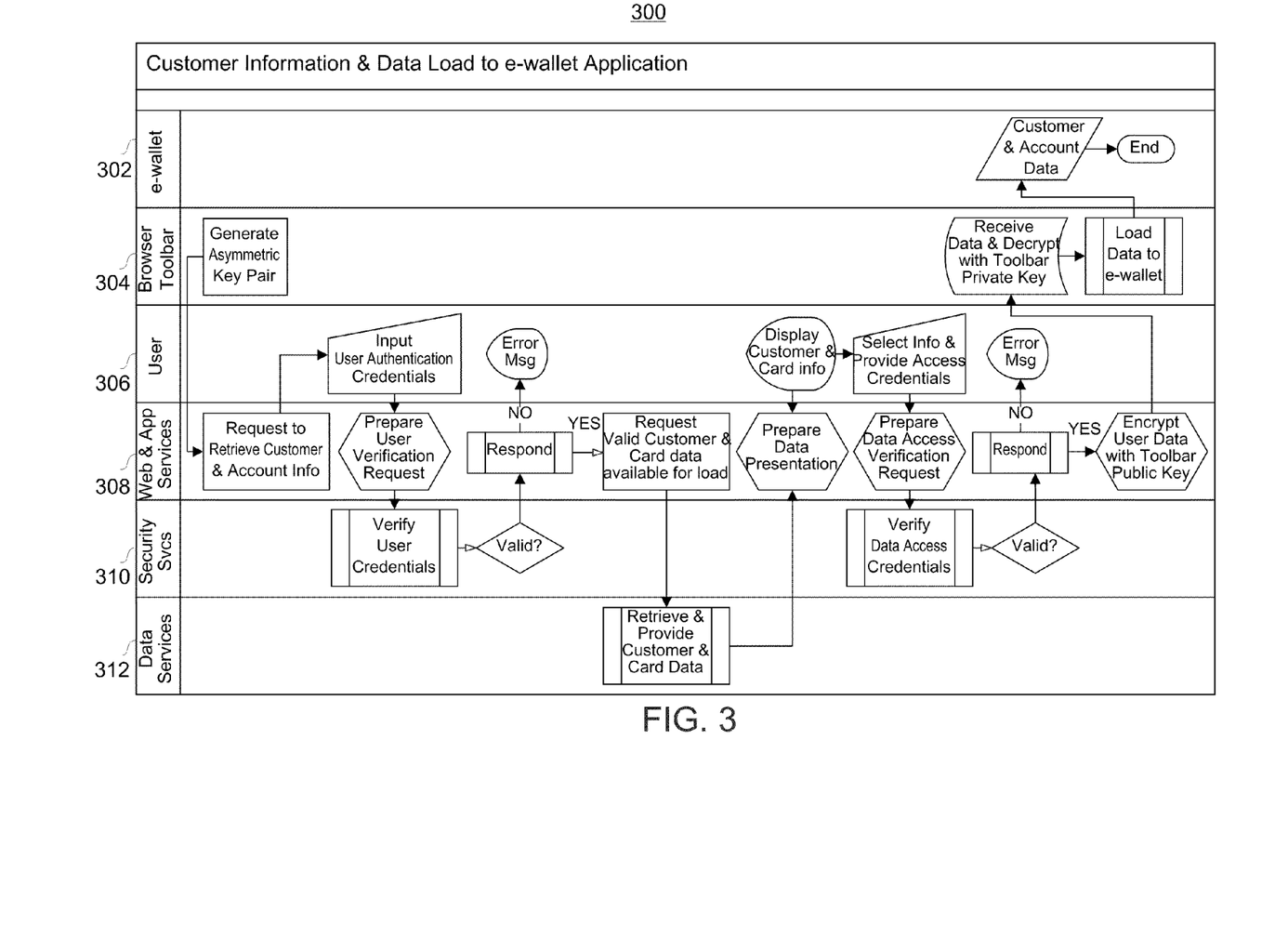
FIG. 3 is a flowchart illustrating the functional modules associated with specific function(s) to securely download personal identifiable information data to a customer's computer in one embodiment of the present invention.

FIG. 3 illustrates the functional modules associated with securely downloading PII data to a customer's computer, according to one embodiment of the invention. Particularly, FIG. 3 is described with respect to the following entities and functional modules: e-wallet 302, browser toolbar 304, user 306, web and application services 308, security services 310, and data services 312. Modules 302-306 are associated with a customer's computer and modules 308-312 are associated with a card issuer.

Browser toolbar 304 creates an asymmetric private/public key pair which is used to encrypt one or more PII data transfers from/to the browser toolbar 304. Web and application services 308 receives a request from browser toolbar 304 to retrieve customer and account information, and detects a request for PII data.

The user 306 is then requested to input user credentials through his or her computing device. Web and application services 308 receives the user credentials and prepares a user verification request for security services unit 310. Security services 310, in turn, verifies the user credentials and notifies web and application services 308 whether the user credentials are legitimate. If the user credentials are not valid, an error message is presented to the user 306. If the user credentials are valid, web and application services 308 requests data services 312 to supply the customer and card data available for loading into browser toolbar 304. Web and application services 308 prepares the customer and card data for presentation and presents it to the user 306.

At this point, the user 306 has the opportunity to select the particular PII data, i.e., account data and card data, that the user 306 wishes to download into e-wallet 302. PII data may be associated with one or more accounts and cards. For each card selected, the user provides card specific access credentials. The card specific access credentials are received by web application services 308 which, in turn, prepares a data access verification request based on the card specific access credentials received.

Security services 310 verifies whether the card specific access credentials are legitimate. If the card specific access credentials are not legitimate, an error message is presented to user 306. If the card specific access credentials are legitimate, then web and application services 308 accesses the requested PII data and encrypts it with the public key previously created by browser toolbar 304. The encrypted data is transmitted to browser toolbar 304, which then decrypts the data and loads it into e-wallet 302.

Figure 4:
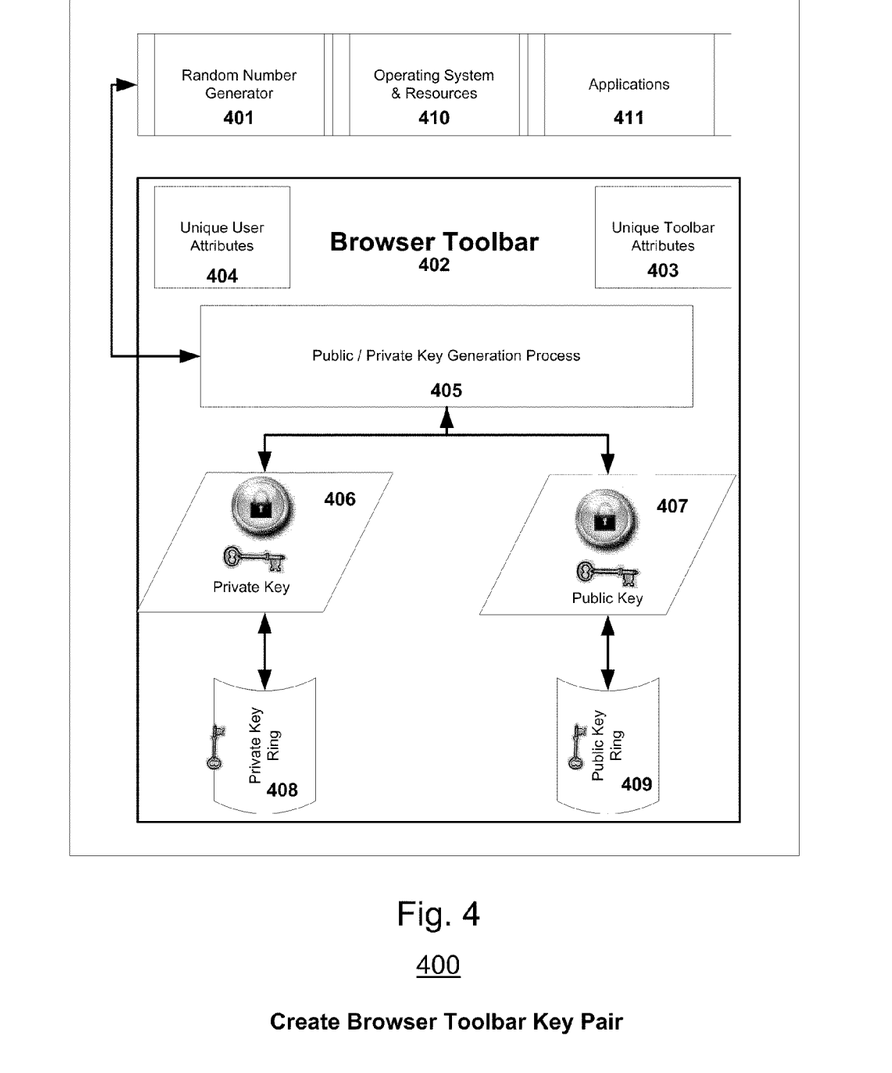
FIG. 4 is a collaboration diagram of functional modules deployed on one or more computer systems for implementing public/private key pair creation in accordance with an embodiment of the present invention.

FIG. 4 is a collaboration diagram of functional modules deployed on one or more computer systems for implementing public/private key pair creation in accordance with an embodiment of the present invention. Particularly, FIG. 4 is described with respect to the following entities and functional modules: random number generator 401, browser toolbar 402, unique toolbar attributes 403, public/private key generation process 405, private key 406, public key 407, private key ring 408, public key ring 409, operating system and resources 410, and applications 411.

Browser toolbar 402 includes processes to create unique toolbar attributes 403 and unique user attributes 404. Public/private key generation process 405 uses any combination of inputs from random number generator 401, unique toolbar attributes 403, unique user attributes 404, applications 411, and other data sources for key pair creation. One or more key generation programs or algorithms can be used to take input from these various sources as desired.

Operating system and resources 410 communicates with browser toolbar 402 to initiate public/private key generation process 405. Public/private key generation process 405 seeks input from one or more sources (e.g., 401, 403, 404, 411, etc.) based on a particular key generation program. These inputs are then input into the key calculation techniques of public/private key generation process 405 for the creation and output of private key 406 and public key 407. Private key 406 and public key 407 are unique to the particular browser toolbar 402 implementing public/private key generation process 405.

Private key 406 and public key 407 are stored as files along with a corresponding "key ring", private key ring 408 and public key ring 409, respectively. The stored private key 406 and private key ring 408 are accessible to the browser toolbar 402 for key retrieval and decryption as needed. The public key 407 and public key ring 409 may be publicly distributed as needed.

The present invention (i.e., system 100, processes 200 and 300, or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 5:
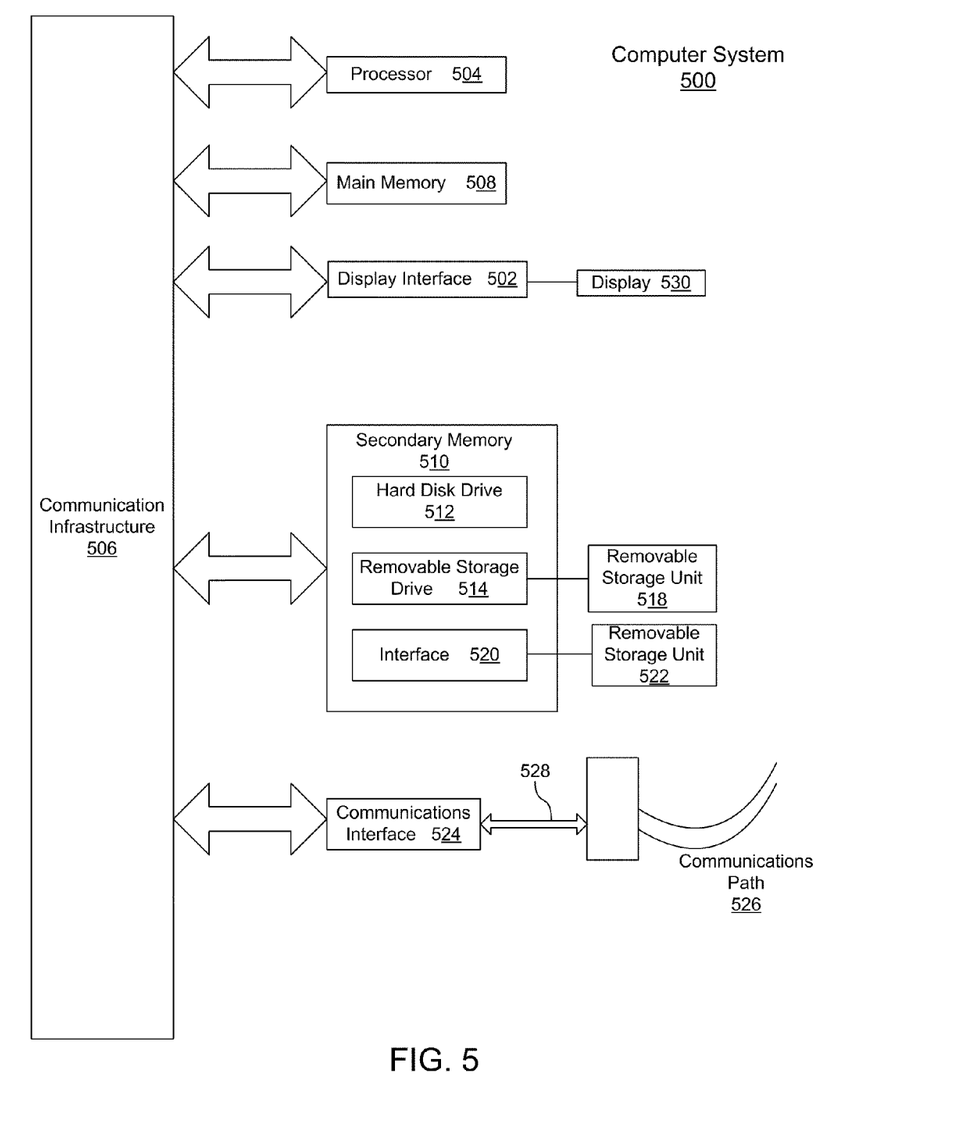
FIG. 5 is a block diagram of an exemplary computer system useful for implementing the present invention.

In fact, in one embodiment, the invention is directed toward one or more computer systems capable of carrying out the functionality described herein. An example of a computer system 500 is shown in FIG. 5.

The computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
    detecting, at a browser toolbar of a computer system, a request from a web service to obtain account information of an account holder, wherein the account information is usable to conduct a transaction with the account holder;
    sending, by the browser toolbar, a request for the account information to a secure database that stores the account information;
    decrypting, by the browser toolbar, encrypted data received from the secure database, wherein the encrypted data includes the account information, wherein the decrypting is performed using an encryption key maintained by the browser toolbar and inaccessible outside of the browser toolbar;
    securely storing the account information at the browser toolbar; and
    removing the stored account information from the browser toolbar after completion of the transaction.

2. The method of claim 1, wherein the detecting includes analyzing, by the browser toolbar, content of the web service to detect the request.

3. The method of claim 1, further comprising:
    authenticating, via the browser toolbar, the account holder prior to sending the request for the account information.

4. The method of claim 1, further comprising:
    determining, by the browser toolbar, whether an account of the account holder is eligible to conduct a transaction with the web service.

5. The method of claim 1, wherein the removing is in response to closing a browser session with the web service.

6. The method of claim 1, further comprising:
    providing, via the browser toolbar, the stored account information to the web service in response to the detected request.

7. The method of claim 1, further comprising:
    generating, via the browser toolbar, an encryption key pair, wherein the encryption key pair includes a public encryption key that corresponds to the encryption key.

8. A system, comprising:
    a processor;
    memory having instructions stored therein that are executable by the processor to implement a browser toolbar that performs:
        identifying a request from a web service for account information associated with an account holder, wherein the account information is usable to conduct a transaction with the account holder;
        retrieving an encrypted version of the account information from a remote database;
        decrypting the encrypted version of the account information using an encryption key maintained by the browser toolbar;

completing a website form of the web service with a decrypted version of account information; and deleting the decrypted version of the account information after completing the website form.

9. The system of claim 8, wherein the browser toolbar is further implemented to perform:

creating a public/private key pair, wherein the encryption key is a private key of the pair that is inaccessible outside of the browser toolbar; and sending a public key of the pair to the remote database for encryption of the account information.

10. The system of claim 8, wherein the account information includes a card security code associated with an account of the account holder.

11. The system of claim 8, wherein the browser toolbar is further implemented to perform:

determining whether an account of the account holder is eligible for use with the web service.

12. The system of claim 8, wherein the deleting is performed in response to termination of a browser session associated with the web service.

13. The system of claim 8, wherein the deleting is performed in response to completion of the transaction.

14. The system of claim 8, wherein the browser toolbar is further implemented to perform:

generating an encryption key pair that includes the encryption key.

15. A non-transitory computer readable medium having instructions stored thereon that are executable by a computer system to cause the computer system to perform operations comprising:

determining, at a browser toolbar, that a request for account information has been received from a web service, wherein the account information is usable to conduct a transaction with an account holder;

sending, via the browser toolbar, a request for the account information to a secure remote database;

decrypting, at the browser toolbar, encrypted data received from the remote database to obtain the account information, wherein the decrypting is performed using an encryption key generated by the browser toolbar;

providing the account information to the web service to initiate the transaction; and removing the account information from the computer system after providing the account information to the web service.

16. The non-transitory computer readable medium of claim 15, wherein the determining includes analyzing, by the browser toolbar, web service content to detect the request from the web service.

17. The non-transitory computer readable medium of claim 15, wherein the removing is performed in response to completion of the transaction.

18. The non-transitory computer readable medium of claim 15, wherein the operations further comprise:

generating the encryption key in response to the request from the web service; and removing the encryption key from the computer system after the decrypting.

19. The non-transitory computer readable medium of claim 18, wherein the encryption key is a private key having a corresponding public key.

20. The non-transitory computer readable medium of claim 15, wherein the operations further comprise:

authenticating the account holder prior to sending the request to the secure remote database.

* * * * *